Patented Aug. 3, 1954

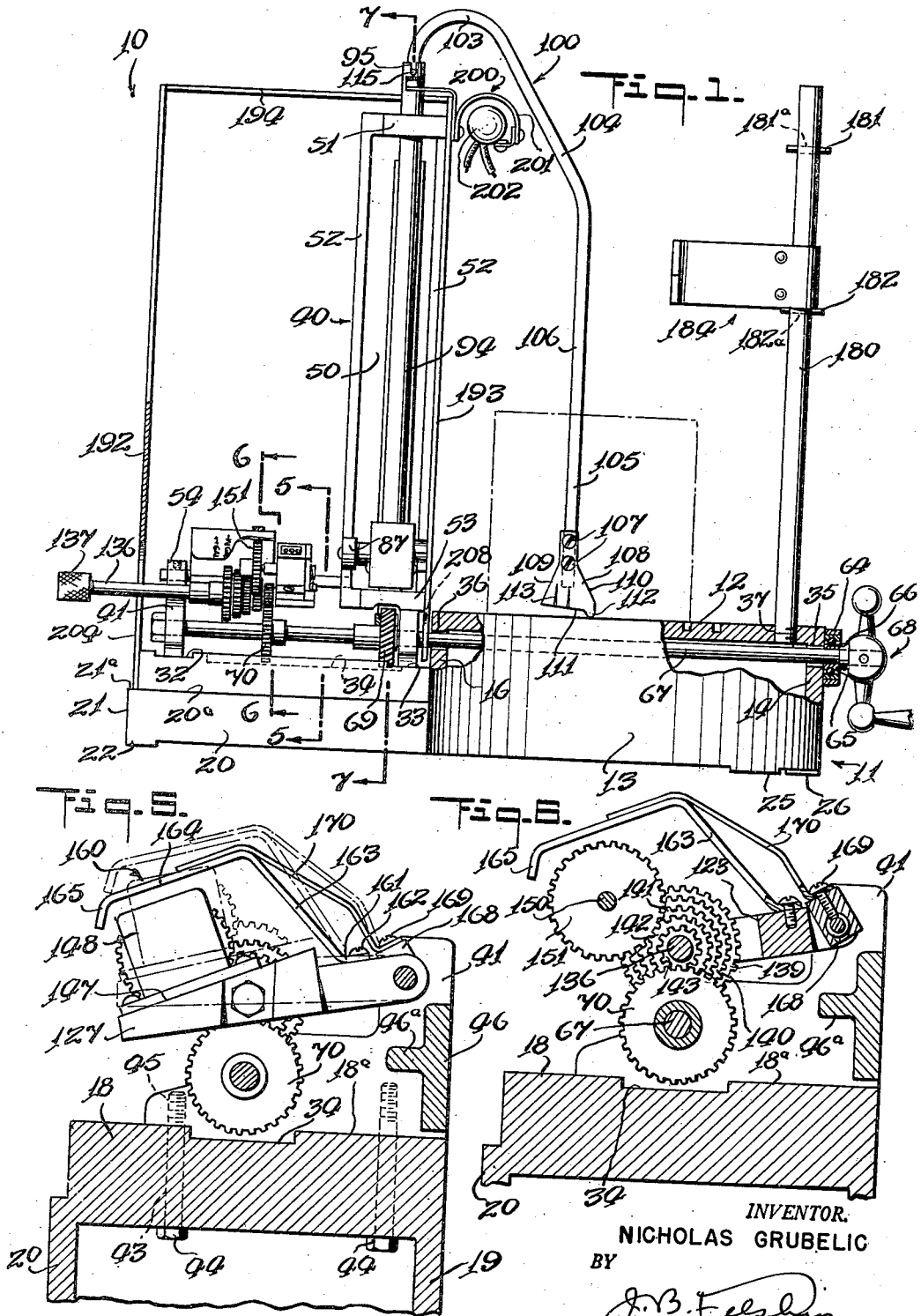

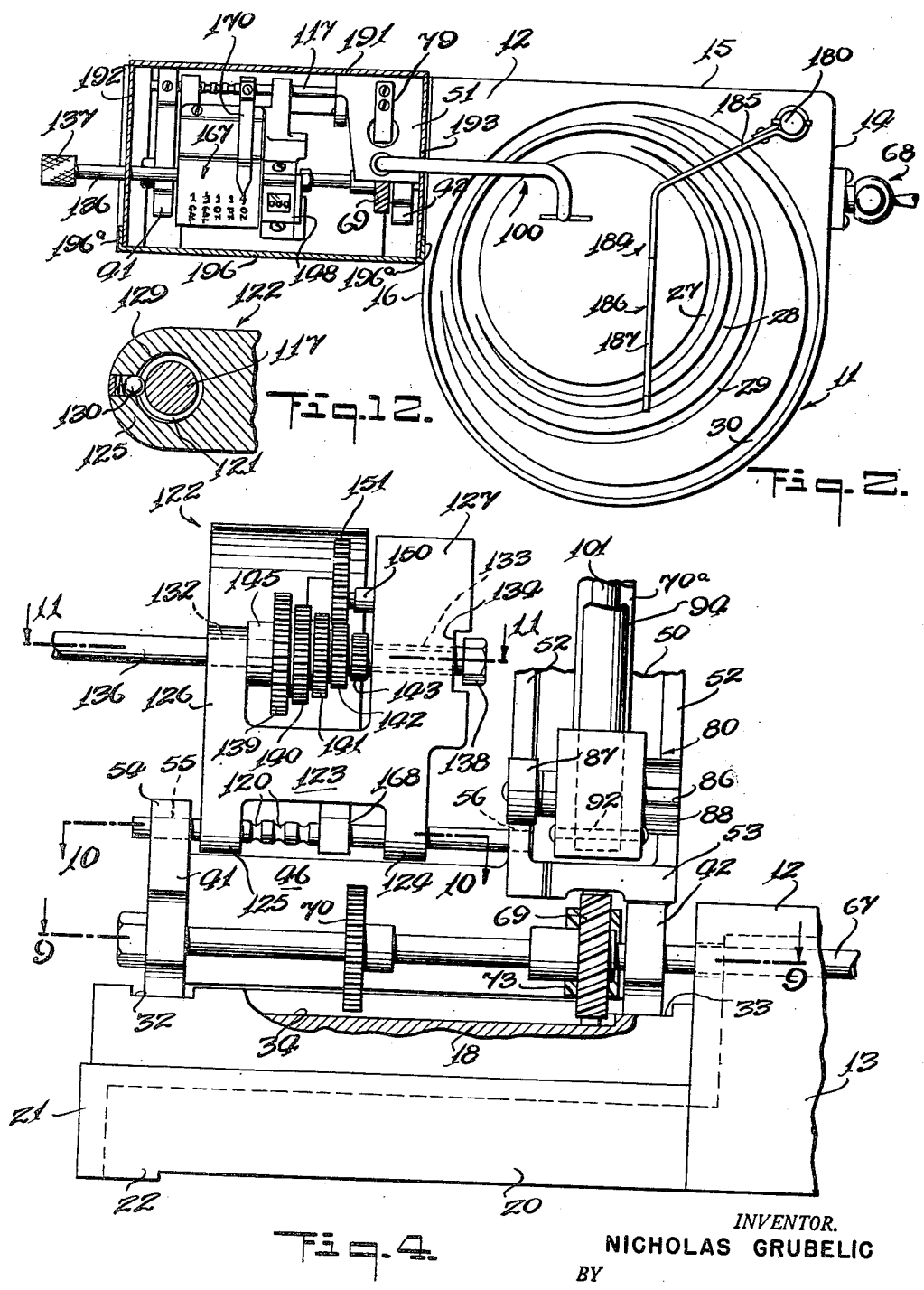

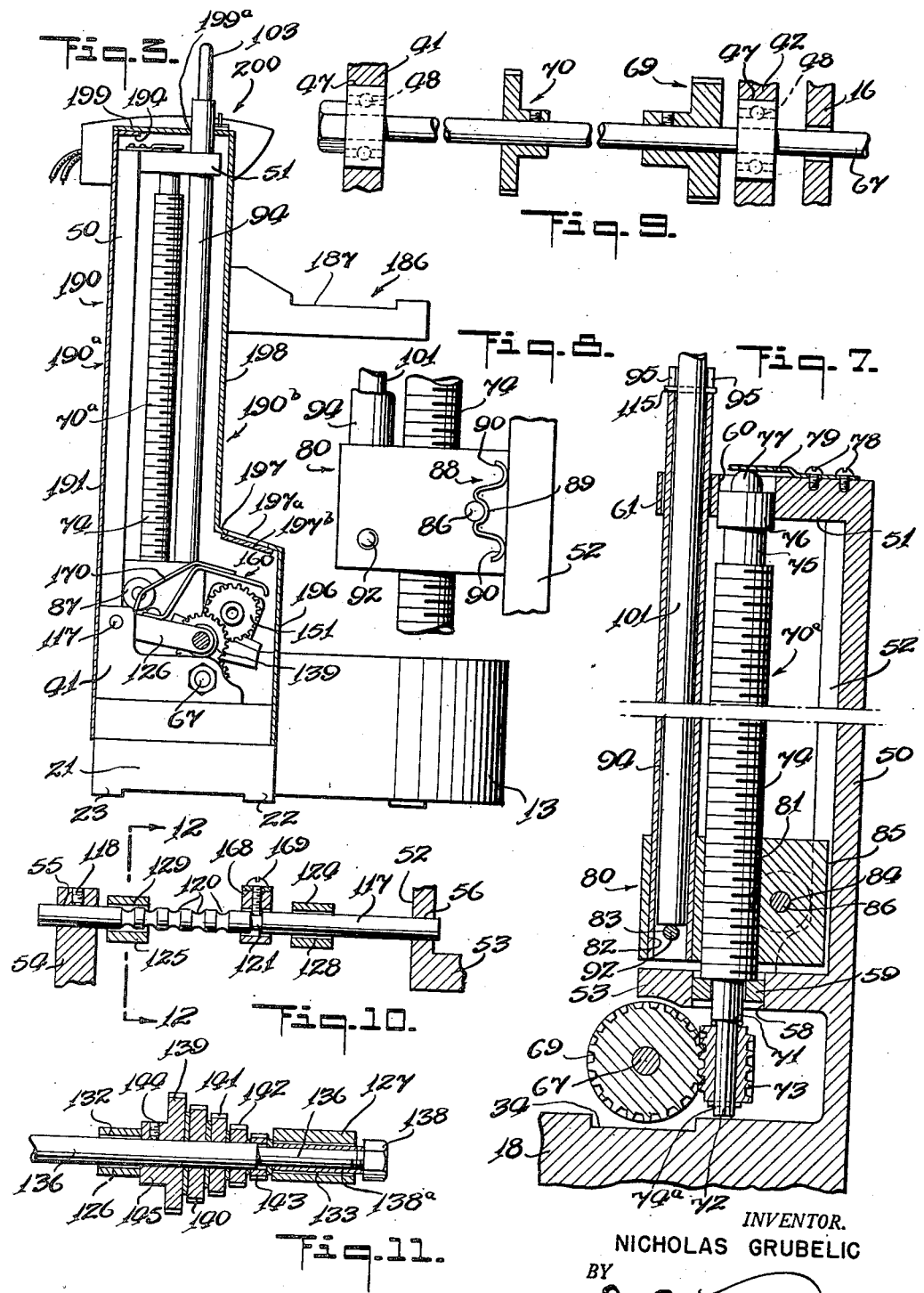

2,685,135

UNITED STATES PATENT OFFICE 2,685,135

FLUID MEASURING DEVICE

Nicholas Grubelic, Williston Park, N. Y., assignor of fifty per cent to Israel Kushner, Great Neck, N. Y.

Application June 20, 1950, Serial No. 169,255

6 Claims. (Cl. 33—126.7)

This invention relates to devices for measuring fluids. It is particularly directed to a machine for measuring quantities of different basic color paints, poured into a receptacle to obtain the desired proportion of the paint, conforming to a formula.

One object of this invention is to generally improve the device disclosed in my copending application Serial No. 606,354 filed July 21, 1945, for Fluid Measuring Device issued as Patent No. 2,563,601 on August 7, 1951.

Another object of this invention is to provide a highly simplified machine of the character described for measuring predetermined amounts of different basic color paints for filling different total volumes of paint, for example, a 4 oz. can, a 1 pt. can, a 1 qt. can, a ½ gal. can, or a 1 gal. can, with the use of only a single counter or dial and with the use of transmission gearing.

Yet another object of this invention is to provide in a machine of the character described, highly simplified means for changing the device to adapt it for measuring different total quantities, such change being accomplished by mere shifting of one part of the machine from one position to another.

Still another object of this invention is to provide in a machine of the character described, a base provided with grooves of various diameters so that cans of various sizes may be selectively placed on the base and each groove will receive the rim edge at the lower end of a can, so that the can will rest flat on its bottom wall, so that as the can fills with paint the bottom wall will not belly downwardly, whereby to permit accurate measurement of paint in the can.

A still further object of this invention is to provide a rugged and compact machine of the character described which shall be easy to manipulate, which shall comprise few and simple parts, which shall be relatively inexpensive to manufacture and which shall yet be practical and efficient to a high degree in use.

Other objects of this invention will in part be obvious and in part hereinafter pointed out.

The invention accordingly consists in the features of construction, combination of elements, and arrangement of parts, which will be exemplified in the construction hereinafter described, and of which the scope of invention will be indicated in the following claims.

In the accompanying drawings in which is shown various illustrative embodiments of this invention, Fig. 1 is a front elevational view of a machine embodying the invention, with parts broken away and in cross-section;

Fig. 2 is a top plan view of the machine, with parts broken away and in cross-section;

Fig. 3 is a vertical elevational view of the device, with parts broken away and in cross-section;

Fig. 4 is a front elevational view of part of the device and illustrating the transmission gearing;

Fig. 5 is a cross-sectional view taken on line 5—5 of Fig. 1;

Fig. 6 is a cross-sectional view taken on line 6—6 of Fig. 1;

Fig. 7 is a cross-sectional view taken on line 7—7 of Fig. 1;

Fig. 8 is a side elevational view showing the nut on the vertical screw shaft;

Fig. 9 is a cross-sectional view taken on line 9—9 of Fig. 4;

Fig. 10 is a cross-sectional view taken on line 10—10 of Fig. 4;

Fig. 11 is a cross-sectional view taken on line 11—11 of Fig. 4; and

Fig. 12 is a cross-sectional view taken on line 12—12 of Fig. 10.

Referring now in detail to the drawing, 10 designates a measuring machine embodying the invention. The same comprises a base 11 which may comprise a casting of aluminum or other metal, or other suitable material. Said base is hollow at its underside. The base 11 comprises a top wall 12. Extending downwardly from the front of the base is a semi-cylindrical wall 13. Extending downwardly from the outer side of the base is a skirted wall 14 which merges with the semi-cylindrical wall 13. Extending downwardly from the rear of the top wall is a rear skirted wall 15 at right angles to the wall 14. Extending downwardly from the side of the top wall 12, opposite to the wall 14, is a wall 16, likewise merging with and tangent to the semi-cylindrical wall 13. Extending from the side wall 16 is a top horizontal wall 18 at a level lower than the top wall 12. Extending downwardly from the rear of the top wall 18 is a wall 19 which merges with the rear wall 15 and forms an extension thereof. Extending downwardly from the front of the top wall 18 is a front wall 20 which extends to the wall 16. Extending downwardly from the left end of the top wall 18 is an end wall 21. At the junction of the walls 20 and 21 is a front corner leg 22. At the junction of the rear wall 19 and the end wall 21 is a rear leg 23. Extending downwardly from the semi-cylindrical wall 13 is a leg 25, and at the junction of the walls 14 and 15 is a rear corner leg 26 similar to the legs 22, 23 and 25. The base thus rests on its legs 22, 23, 25 and 26.

The top wall 12 is formed in its upper surface with an annular groove 27 of such diameter that a pint paint can placed on the base will have the lower rim edge thereof received within the groove 27. Said base is also formed with an annular groove 28 merging with the groove 27 at one point, and otherwise surrounding the same and of such diameter as to receive the lower rim edge of a quart paint can placed on the base. Said base is also provided with an annular groove 29 in its top surface, spaced from the merging portions of the groove 27, 28, and of such diameter as to receive the lower rim edge of a ½ gallon paint can placed on the base. Said base is also provided in its upper surface with a groove 30 merging with the groove 29 and of such diameter as to receive the lower edge of a gallon paint can placed on the base.

With such construction either a pint, quart, ½ gallon or gallon paint can placed on the base will have its bottom wall contacting the top surface of the base so that when paint is poured into the can, its bottom wall will not belly downwardly as is the case when the can rests on its rim edge instead of its bottom wall.

It will be noted that the groove 30 substantially follows the curvature of the semi-cylindrical wall 13.

The front wall 20 furthermore is formed with a horizontal external shoulder 20a, and the end wall 21 is formed with a horizontal external shoulder 21a at the same level as the shoulder 20a. The upper surface 18a of the top wall 18 is furthermore formed with a pair of parallel spaced horizontal grooves 32 and 33 extending from front to rear, and with an additional horizontal groove 34 extending from side to side and communicating with the groove 33.

The side wall 14 is formed with a horizontal through opening 35 below the top wall 12 and close to the rear wall 15. The wall 16 is formed with a horizontal through opening 36 aligned with the opening 35 for the purpose hereinafter appearing. Said top wall 12 is furthermore formed in the rear right corner thereof with a threaded vertical through opening 37 for the purpose hereinafter appearing.

Mounted on the wall 18 of the base is a frame member 40 which may likewise be made of a casting of aluminum or other suitable metal. The frame 40 comprises a pair of parallel side walls 41 and 42 having lower edges contacting the grooved surfaces 32 and 33 respectively. The top wall 18 is formed with through openings 43 to receive studs 44 extending through such openings and said studs being screwed into threaded openings 45 in the side walls 41, 42 for fixing the frame to the base. The side walls 41, 42 are interconnected by a rear wall 46 from which extends inwardly a web 46a likewise interconnecting said side walls. The side walls 41, 42 are formed with aligned through openings 47 horizontally aligned with the openings 35 and 36. Within the openings 47 are ball bearings 48 for the purpose hereinafter appearing.

Extending upwardly from the right end of the rear wall 46 is an upstanding wall 50 projecting to a considerable height above the side walls 41, 42. Extending forwardly from the upper end of the rear wall 50 is a top lug 51. Extending forwardly from the side edges of the rear wall 50 are parallel, vertical strengthening ribs 52. Extending forwardly from the lower end of the rear wall 50 is a bottom lug 53. The bottom lug 53 merges with the side wall 42. The side wall 41 is formed adjacent its rear end with an upstanding projection 54. The projection 54 is formed with a horizontal through opening 55. At the lower end of the left rib 52 is a horizontal through opening 56 aligned with the opening 55. The bottom lug 53 is formed with a vertical through opening 58 in which is fixed a bushing 59. The top lug 51 is formed with a vertical through opening 60, vertically aligned with the opening 58. The top lug 51 is furthermore formed with a vertical through opening 61 spaced forwardly of the through opening 60. The opening 61 may be of smaller diameter than the opening 60.

Attached to the outer side of the wall 14 of the base is a bearing block 64 formed with a through opening 65 receiving the ball bearing 66, the opening of which is aligned or coaxial with the opening 35. The block 64 may be attached to the wall 14 by screws or in any other suitable manner. Extending through the ball bearing 66 of the bearing block 64 and through the ball bearing 48 in the openings 47 is a horizontal shaft 67. The shaft 67 also passes through the openings 35 and 36 which are larger than the shaft. Said shaft 67 lies below the top wall 12 but above the top wall 18. Fixed to the right end of the shaft 67 (which projects beyond the bearing block 64) is a handle 68 for turning the shaft. Fixed to the shaft 67 and disposed between the parallel walls 41 and 42 and adjacent to the wall 42 is a worm wheel 69 for the purpose hereinafter appearing. Also fixed to the shaft 67 and located between the worm wheel 69 and the vertical end wall 41 is a gear 70, the purpose of which will be explained hereinafter.

Mounted for rotation on and between the top and bottom lugs 51, 53 is a vertical screw 70a. The screw 70a comprises a reduced shaft portion 71 passing through the bushing 59. Extending from the lower end of the shaft portion 71 is another reduced shaft portion 72 on which is fixed a worm gear 73 meshing with the worm wheel 69. At the lower end of the shaft 72 is a pin 74a to retain the vertical position of the worm gear 73. The screw 70a comprises an enlarged screw threaded portion 74, the lower end of which rests on the thrust bushing 59. Extending above the screw threaded portion 74 is a portion 75 having an enlarged portion 76 journalled within the opening 60. Extending above the enlarged portion 76 is a rounded upper end portion 77 which projects somewhat above the opening 60. Fixed to the top lug 51 by a pair of screws 78 is a free ended strip spring 79 contacting the top of the rounded upper end portion 77 of member 70a to keep the screw from moving upwardly.

It will now be observed that upon rotating the handle 68 shaft 67 will be rotated and worm wheel 69 meshing with the worm gear 73 will rotate the screw member 70a. On the screw threaded portion 74 of member 70a is a travelling nut 80. The nut 80 is formed with a vertical screw threaded opening 81, the threads of which engage the threads of the screw threaded portion 74. Said nut 80 is also formed with a vertical through opening 82 parallel to the opening 81 and in alignment with the opening 61 in the top lug 51. Said nut is furthermore formed with a horizontal through opening 83 transverse to the opening 82 and communicating therewith. The nut is furthermore formed with a horizontal transverse through opening 84 disposed between threaded opening 81 of the rear surface 85 of the nut. Extending through the through opening 84 is a transverse shaft 86. Rotatably mounted on one end of the shaft 86 is a roller 87 having rolling engagement with one of the ribs 52 of the frame 40. Interposed between the other end and shaft 86 and the other rib 52 is a strip spring 88 having a U-shaped portion 89 engaging the shaft and curved end fingers 90 having sliding engagement with said other rib 52. Thus as the shaft 67 is rotated for rotating member 70a about its axis, the nut 80 will will move either up or down, depending upon the direction of rotation. The nut will be guided by engagement of the roller 87 with one rib 52 and engagement of the fingers 90 of the spring 88 with the other rib 52.

Received within the transverse opening 83 is a transverse shaft 92 which traverses the opening 82. Inserted into the opening 83 is the lower end of a vertical tube 94. The lower end of the tube 94 is flush with the undersurface of the nut 80. The tube projects through the opening 61 and above the upper lug 51. The tube 94 is formed with openings registering with the openings 83 and through which the shaft 92 passes, thus fixing the lower end of the tube to the nut. The upper and lower ends of the tube are open. The upper end of the tube is furthermore formed with a pair of diametrically opposed longitudinal slots or notches 95 extending down from the upper edge of the tube. It will now be observed that as the nut is moved up and down the tube will slide through the opening 61, there being enough clearance between the tube and the inner surface of the opening to permit free movement of the tube up and down. The tube hence moves up or down with the nut 80.

Mounted on the tube is a level indicator member 100. The indicator member 100 comprises a vertical rod portion 101 disposed within the tube. The lower end of said vertical rod portion 101 rests on the transverse shaft 92. The straight rod portion 101 extends above the upper end of the tube 94. Extending from the upper end of the vertical rod portion 101 is a curved portion 103 and extending therefrom is a downwardly inclined portion 104. Extending downwardly from portion 104 is a vertical portion 105. Portion 105 extends to a point below the lower end of the vertical rod portion 101. In the portion 105 is a forwardly bent intermediate portion 106. Thus the portions 101, 103 and 104 and the upper part of portion 105 are in a single plane and the lower end of portion 105 below portion 106 is in a plane forwardly of portions 101, 103 and 104. The lower end of the indicator portion 105 is flattened and screwed thereto by means of screws 107 is an indicator plate 108. The plate 108 is generally triangular in shape. It has downwardly and outwardly diverging edges 109 and 110 and a lower downwardly and outwardly inclined edge 111. At the junction of the edges 110, 111 is a downwardly extending lip 112. The front face of the indicator plate 108 may be provided with a pair of spaced indicator marks 113 extending to the edge 111. Fixed to the upper end of vertical portion 101 is a transverse pin 115 projecting in opposite directions, and the projecting portions are received in the slots 95, to keep the indicator member from rotating about the tube 94. The indicator member may be lifted out of the tube at any time. When the outer ends of the pin 115 are in the slots 95, the indicator plate 108 is above the portion of the top surface of the base which is within the annular groove 27. Thus should a can of any size be placed on the base the indicator plate will move through the can.

Supported within the aligned openings 55, 56 is a transverse shaft or axle 117. The shaft may be fixed against turning by means of a set screw 118 on the projection 54. The shaft 117 may be formed with 5 annular spaced grooves 120 and with a central annular groove 121, for the purpose hereinafter appearing. Slidably and swingably mounted on the shaft 117 is a gear bracket 122. The bracket 122 may be made as a casting likewise of aluminum or any other suitable metal. It is somewhat of H shape comprising a transverse portion 123, a pair of rearwardly extending lugs 124 and 125 extending from the transverse portion 123, and a pair of forwardly extending portions 126 and 127 likewise extending from the transverse portion 123. The portions 124 and 125 are formed with aligned through openings 128 and 129 respectively, through which the shaft or axle 117 passes. On the lug 125 is a spring pressed ball 130 (Fig. 12) adapted to selectively snap into the various grooves 120 to keep the member 122 from accidentally sliding relative to the shaft, while permitting said member 122 to swing about the shaft. Thus the spring pressed ball will keep member 122 in any one of 5 positions or other selected number of positions.

The lug 126 is formed with a through opening 132 and portion 127 is formed with a through opening 133 aligned with the opening 132. The outer edge of member 127 may be formed with a notch 134. Extending through the openings 132, 133 is a rotary gear shaft 136 parallel to and spaced from axle 117. At one end of the shaft 136 is a thumb handle 137 to facilitate rotating said shaft. The other end of the shaft 136 is reduced and screwed thereon is a nut 138 which may be partially received in the notch 134. Nut 138 presses against bushing 138a on the reduced portion of the shaft 136. On the shaft 136 are fixed a set of gears 139, 140, 141, 142 and 143, which may be selectively engaged with the gear 70. Spacers may be interposed between the gears. The nut 138 presses the bushing to clamp the gears together. It will now be understood that the operator may grasp the handle 137 and swing member 122 upwardly about shaft 117 and then move said member 122 longitudinally to bring any one of the gears 139, 140, 141, 142 or 143 into alignment with the gear 70. Gears 139 to 143 are spaced apart similarly to grooves 120. Member 122 can then be dropped to mesh the aligned gears. The spring pressed ball 130 will retain the shaft 136 in any longitudinal position to which it is shifted. The gear 139 may be fixed to the shaft 136 in any suitable manner as for example by a set screw 144 on a collar 145 which contacts the projection 126.

The portion 127 of member 122 has an upwardly and rearwardly beveled or inclined surface 147. Fixed thereon is a counter 148. The counter may be of any suitable type and comprises a plurality of numbered wheels interconnected by transfer gearing. For the purpose of illustration the counter is shown to comprise 3 numbered wheels. Each has the numbers 0, 1, 2, 3, 4, 5, 6, 7, 8, 9, on its periphery so that the counter can give a count from 0 to 999. The counter is provided with an operating shaft 150 projecting from the counter. On the counter shaft 150 is a gear 151 which may mesh with the gear 142. It will now be understood that when the member 122 is permitted to drop down by gravity and the shaft 67 is thereafter rotated, shaft 136 will be rotated for rotating the counter shaft 150 through its gear 151. When the handle 137 is grasped and the shaft 136 raised up, to swing the member 122 upwardly, then the handle 137 can be turned for adjusting the counter to any desired reading independently of the shaft 67.

Attached to the top surface of transverse portion 123 of member 122 is a cover scale member 160 made of sheet metal, if desired. Member 160 has a flange 161 contacting the upper surface of part 123 and is attached thereto by means of screws 162. Extending upwardly and forwardly from flange 161 is a portion 163 from which extends forwardly a wall 164 which overlies the gears on the shaft 136. Extending downwardly from wall 164 is a lip 165. The top surface of portion 164 may be marked with a scale 167 to indicate the total quantities of paint to be measured. Thus the scale may have a 4 oz. mark aligned with gear 143, a 1 pt. mark aligned with gear 142, a 1 qt. mark aligned with gear 141, a ½ gal. mark aligned with gear 140, and a 1 gal. mark aligned with gear 139.

Rotatably mounted on shaft 117 is a collar 168 and attached thereto by means of a set screw 169 is a pointer 170. The forward end of the pointer overlies the scale 167. The pointer will either point to the 4 oz., 1 pt., 1 qt., ½ gal. or 1 gal. mark, on the scale 167, depending upon the longitudinal position to which the shaft 136 is shifted. The set screw 169 projects into the groove 121 to prevent sideways shifting of the collar 168. Thus when member 122 is down the operator can know whether the machine is set for filling either a 4 oz. can, a 1 pt. can, a 1 qt. can, a ½ gal. can, or a 1 gal. can. The gears 70, 139 to 143 and 151 are so selected in relation to the worm wheel 69, worm 73 and screw portion 74 so as to raise the indicator 100 proper vertical distances in any adjusted position of the shaft 136.

One selection of gearing and screw threads may be as follows: The screw threads on the screw shaft portion 74 may be 13 per inch. The worm and worm gear 69, 73 may be so selected that 6½ turns of shaft 67 will raise the nut one inch. Gear 70 may have 44 teeth for lacquer paint, or 48 teeth for synthetic paint, gear 139 may have 48 teeth, gear 140 may have 37 teeth, gear 141 may have 31 teeth, gear 142 may have 24 teeth, gear 143 may have 18 teeth and gear 151 may have 48 teeth. Thus two revolutions of shaft 136 will cause one revolution of counter shaft 150. With such an arrangement the machine is used for formulae using a scale of 200.

The use of the machine will not be described. Let us assume that a one gallon can of synthetic paint is to be mixed. The gallon can is first placed on the top wall 12 of the base with the bottom rim of the can disposed within the groove 30. The handle 68 is then turned until the lip 112 on the indicator plate 108 touches the bottom of the can. The handle 137 is then grasped and raised and turned to bring the counter dial to a reading of 980. Shaft 136 is then shifted to bring the pointer 170 to the one gallon mark on the scale 167. Member 122 is then dropped so that gear 139 will mesh with the gear 70. (Gear 70 for synthetic paint should be 48 teeth.) The handle 68 is then rotated to a position where the dial on the counter reads 0, 0, 0. Drier is then poured into the can to a level between where the markings 113 intersect the edge 111 on the indicator plate 108.

Let us assume that the formula for the paint to be measured is as follows: black 23, blue 68, white 107, yellow 200.

The handle 68 is then turned until the dial on the counter reads 23. During this movement the indicator is raised. Black paint is then poured into the gallon can to the level between where the markings 113 intersect the edge 111 on the indicator plate 108. The handle is then turned until the counter dial reads 68 and blue paint is poured into the gallon can to the indication point on the indicator plate 108. The handle is then turned until the counter dial reads 107 and white paint is poured to the level of the indicator. The handle is then turned until the counter dial reads 200 and yellow paint is poured in to the indicator level. At this time the gallon can is full.

The worm wheel 69 and worm 73 are so selected that 6½ turns of shaft 67 will raise the nut 80 one inch. Thus one turn of the shaft 67 will cause two turns of the screw member 70a. 40 turns of shaft 67 will cause a rise of the nut 6²⁰⁄₁₃". Forty turns of the shaft 67 will cause 40 turns of shaft 136 when gears 139 and 70 are each 48 teeth, but the counter shaft will make 20 turns to read 200 on the indicator dial because gear 142 has 24 teeth and the indicator shaft gear 151 has 48 teeth. The amount of drier in the gallon can will be sufficient to bring the total height of paint in the can to about 6⅞" which is the height of the gallon can.

For lacquer paint no drier is used. The machine is started with the nut all the way down and the dial at 0, 0, 0. Thinner is poured into the can to the level of the indicator. Then the formula is worked bringing the dial to a reading of 200. A reading of 200 on the dial means 20 turns on the counter dial shaft or 40 turns on shaft 136. When lacquer paint is being mixed, gear 70 should have 44 teeth so that 40 turns on shaft 136 will give a little more than 43½ turns of the shaft 67 which will give a rise of somewhat 6.7" on the nut. The rest of the gallon can is taken up by the thinner.

While this application mentions certain gear specifications, it will be understood that any suitable selected gear ratios may be used. For different counter dials the gears may be changed accordingly. Thus if it is desired to use a counter dial of 100 parts instead of 200 parts, the counter shaft gear 151 would be replaced by a gear which meshes with the gear 139 so that the angular rotation of the shaft 136 would be the same as the angular rotation of the shaft 150.

Means is provided to support cans of basic paints which are poured into the mixing cans placed on the base wall 12. To this end there is screwed into the threaded opening 37 the lower end of a vertical rod 180. Mounted on the shaft 180 at two different levels are transverse pins 181 and 182, passing through transverse openings 181a and 182a respectively, formed in the rod. Rotatably mounted on the shaft and resting either on the pin 182 or 181 is a bracket 184 having an arm 185 extending radially from the rod 180 and an arm 186 extending at an angle to the arm 185 and formed with a cut-away slot 187 in its upper end. The can of basic paint to be poured may be rested on the arm 186.

A casing 190 is provided to enclose the frame member 40. Said casing 190 comprises a rear part of member 190a having a vertical back wall 191 from which extend forwardly side walls 192 and 193 and a top lip 194. The lower portions of the side walls extend more forwardly than the upper portions thereof, forming intermediate forwardly and downwardly inclined edges. The casing comprises a second part 190b. The part 190b comprises a front wall 196 from which extends a wall 197 inclined upwardly and rearwardly and contacting the inclined edges of the side walls. Extending upwardly from wall 197 is vertical wall 198 and extending therefrom is top wall 199. The walls 196, 197, 198 and 199 are formed with side flanges 196a which fit over and receive the side walls of part 190a. The part 190b may be attached to the part 190a by any suitable screws or the like, passing through such flanges.

A lamp 200 may be attached to the upper end of the side wall 193. Said lamp comprises a reflector 201 supporting a lamp 202. The side wall 192 is formed with a longitudinal slot 204 through which the shaft 136 passes. The wall 193 has a slot 208 at its lower end through which the shaft 67 passes.

The top wall 199 is formed with a hole 199a through which the tube 94 projects. The wall 197 is formed with an opening 197a covered by a transparent window pane 197b to permit the operator to see the scale 167 from the outside.

It will thus be seen that there is provided a device in which the several objects of this invention are achieved and which is well adapted to meet the conditions of practical use.

As various posible embodiments might be made of the above invention, and as various changes might be made in the embodiment above set forth, it is to be understood that all matter herein set forth or shown in the accompanying drawings is to be interpreted as illustrative and not in a limiting sense.

Having thus described my invention I claim as new and desire to secure by Letters Patent:

1. A device of the character described comprising a base, a frame on said base, a screw mounted for rotation on the frame, a shaft mounted for rotation on the base, a handle on the shaft, a worm wheel on the shaft, a worm gear on the screw meshing with the worm wheel, a gear fixed on the shaft, a nut having threaded engagement with the screw, a level indicator mounted on the nut for movement therewith, an axle fixed to the frame and disposed parallel to the shaft, a member pivoted about the axle and slidable thereon, a second shaft rotatably and non-slidably mounted on said member, a set of gears of different sizes mounted on said second shaft for rotation therewith and selectively engageable with the gear on the first shaft, a counter on said member and including a counter shaft, and a gear on the counter shaft meshing with one of the gears of said set of gears.

2. A paint measuring device comprising a base having a top surface on which a paint can be placed, an extension on the base having a top surface at a lower level than the first surface, a frame fixed on top of said extension, a horizontal shaft mounted for rotation on the base and frame, said frame having a vertical portion and being formed with top and bottom lugs, a screw rotatably mounted on said lugs and disposed in vertical position, a worm gear at the lower end of the screw, a worm wheel on the shaft meshing with said worm, a nut meshing with the screw, a tube mounted at its lower end on the nut, said upper lug having an opening through which said tube passes, a level indicator having an arm received within the tube and another arm disposed above the upper surface of the base, a handle on the shaft, a gear fixed to the shaft and rotatable therewith, an axle on the frame parallel to the shaft, a member pivotally and slidably mounted on said axle and being rotatable about the axle and shiftable longitudinally thereof, a counter mounted on said member, a set of gears mounted for rotation on said member about an axis parallel to and spaced from said axle and selectively engageable with the gear on said shaft, and driving means to connect the counter with one of the gears in said set.

3. A device of the character described comprising a base, a frame on said base, a screw mounted for rotation on the frame, a shaft mounted for rotation on the base, a handle on the shaft, a worm wheel on the shaft, a worm gear on the screw meshing with the worm wheel, a gear fixed on the shaft, a nut having threaded engagement with the screw, a level indicator mounted on the nut for movement therewith, an axle fixed to the frame and disposed parallel to the shaft, a member pivoted about the axle and slidable thereon, a second shaft rotatably and non slidably mounted on said member, a set of gears of different sizes mounted on said second shaft for rotation therewith and selectively engageable with the gear on the first shaft, a counter on said member and including a counter shaft, a gear on the counter shaft meshing with one of the gears of said set of gears, and a scale fixed to said member and overlying said set of gears.

4. A device of the character described comprising a base, a frame on said base, a screw mounted for rotation on the frame, a shaft mounted for rotation on the base, a handle on the shaft, a worm wheel on the shaft, a worm gear on the screw meshing with the worm wheel, a gear fixed on the shaft, a nut having threaded engagement with the screw, a level indicator mounted on the nut for movement therewith, an axle fixed to the frame and disposed parallel to the shaft, a member pivoted about the axle and slidable thereon, a second shaft rotatably and non-slidably mounted on said member, a set of gears of different sizes mounted on said second shaft for rotation therewith and selectively engageable with the gear on the first shaft, a counter on said member and including a counter shaft, a gear on the counter shaft meshing with one of the gears of said set of gears, a scale fixed to said member and overlying said set of gears, and a pointer rotatably and non-slidably mounted on said axle and adapted to cooperate with said scale.

5. A device of the character described comprising a base, a frame on said base, a screw mounted for rotation on the frame, a shaft mounted for rotation on the base, a handle on the shaft, a worm wheel on the shaft, a worm gear on the screw meshing with the worm wheel, a gear fixed on the shaft, a nut having threaded engagement with the screw, a level indicator mounted on the nut for movement therewith, an axle fixed to the frame and disposed parallel to the shaft, a member pivoted about the axle and slidable thereon, a second shaft rotatably and non-slidably mounted on said member, a set of gears of different sizes mounted on said second shaft for rotation therewith and selectively engageable with the gear on the first shaft, a counter on said member and including a counter shaft, a gear on the counter shaft meshing with one of the gears of said set of gears, a scale fixed to said member and overlying said set of gears, a pointer rotatably and non-slidably mounted on said axle and adapted to cooperate with said scale, and means to retain said set of gears in a plurality of various longitudinal positions of said set of gears.

6. A device of the character described comprising a base, a frame on said base, a screw mounted for rotation on the frame, a shaft mounted for rotation on the base, a handle on the shaft, a worm wheel on the shaft, a worm gear on the screw meshing with the worm wheel, a gear fixed on the shaft, a nut having threaded engagement with the screw, a level indicator mounted on the nut for movement therewith, an axle fixed to the frame and disposed parallel to the shaft, a member pivoted about the axle and slidable thereon, a second shaft rotatably and non-slidably mounted on said member, a set of gears of different sizes mounted on said second shaft for rotation therewith and selectively engageable with the gear on the first shaft, a counter on said member and including a counter shaft, a gear on the counter shaft meshing with one of the gears of said set of gears, a scale fixed to said member and overlying said set of gears, a pointer rotatably and non-slidably mounted on said axle and adapted to cooperate with said scale, means to retain said set of gears in a plurality of various longitudinal positions of said set of gears, and a casing mounted on said base and enclosing said frame and provided with a window opening above said scale.

References Cited in the file of this patent

UNITED STATES PATENTS

| Number | Name | Date |
| --- | --- | --- |
| 45,741 | Olds | Jan. 3, 1865 |
| 1,967,559 | Schreck | July 24, 1934 |
| 2,090,487 | Schwartz | Aug. 17, 1937 |
| 2,354,259 | Grubelic | July 25, 1944 |
| 2,399,291 | O'Neill | Apr. 30, 1946 |
| 2,469,305 | Maltese | May 3, 1949 |
| 2,476,674 | McCauley | July 19, 1949 |
| 2,487,825 | Olvis | Nov. 15, 1949 |

FOREIGN PATENTS

| Number | Country | Date |
| --- | --- | --- |
| 408,394 | Great Britain | Apr. 12, 1934 |